(12) United States Patent
Sennert (10) Patent No.: US 9,440,611 B2
(45) Date of Patent: Sep. 13, 2016

(54) GAS BAG ARRANGEMENT FOR A VEHICLE OCCUPANT RESTRAINT SYSTEM

(71) Applicant: TAKATA AG, Aschaffenburg (DE)

(72) Inventor: Philipp Sennert, Gerbrunn (DE)

(73) Assignee: TAKATA AG, Aschaffenburg (DE)

( * ) Notice: Subject to any disclaimer, the term of this patent is extended or adjusted under 35 U.S.C. 154(b) by 0 days.

(21) Appl. No.: 14/410,480

(22) PCT Filed: Jun. 25, 2013

(86) PCT No.: PCT/EP2013/063248
§ 371 (c)(1),
(2) Date: Dec. 22, 2014

(87) PCT Pub. No.: WO2014/001317
PCT Pub. Date: Jan. 3, 2014

(65) Prior Publication Data
US 2015/0367809 A1     Dec. 24, 2015

(30) Foreign Application Priority Data

Jun. 25, 2012   (DE) .................. 10 2012 210 756

(51) Int. Cl.
*B60R 21/239* (2006.01)
*B60R 21/201* (2011.01)
*B60R 21/2338* (2011.01)

(52) U.S. Cl.
CPC ......... *B60R 21/239* (2013.01); *B60R 21/2338* (2013.01); *B60R 21/201* (2013.01); *B60R 2021/2395* (2013.01); *B60R 2021/23384* (2013.01)

(58) Field of Classification Search
CPC ............ B60R 21/239; B60R 21/2338; B60R 21/2346; B60R 2021/2395; B60R 2021/23384
See application file for complete search history.

(56) References Cited

U.S. PATENT DOCUMENTS

| | | | |
|---|---|---|---|
| 4,963,412 A * | 10/1990 | Kokeguchi | B32B 3/266 280/743.1 |
| 6,676,158 B2 * | 1/2004 | Ishikawa | B60R 21/233 280/743.1 |
| 7,419,184 B2 | 9/2008 | Green et al. | |
| 7,681,914 B2 | 3/2010 | Maidel et al. | |

(Continued)

FOREIGN PATENT DOCUMENTS

| | | |
|---|---|---|
| DE | 101 36 173 A1 | 2/2003 |
| DE | 2020050 05 797 U1 | 8/2005 |

(Continued)

OTHER PUBLICATIONS

International Search Report dated Oct. 22, 2013 issued in connection with International Application No. PCT/EP2013/063248.

*Primary Examiner* — Darlene Condra
(74) *Attorney, Agent, or Firm* — Gordon & Rees LLP (57) ABSTRACT

A gas bag arrangement for a vehicle occupant restraint system comprises an inflatable gas bag, wherein the gas bag includes at least one vent device for venting gas from the gas bag, wherein the vent device in a first condition has a first outflow cross-section and in a second condition a second outflow cross-section; as well as a release mechanism which initially fixes the vent device and which releases the same after activation. The release mechanism includes an element to be filled with gas, with which the vent device is connected such that before filling of the fillable element it is fixed at the same and during filling of the fillable element is detached from the same, wherein the vent device is directly or indirectly connected with the fillable element via a releasable connection which will tear during filling of the fillable element and release the vent device.

17 Claims, 5 Drawing Sheets

(56) References Cited

U.S. PATENT DOCUMENTS

| | | |
|---|---|---|
| 2003/0020268 A1 | 1/2003 | Reiter et al. |
| 2005/0212273 A1 | 9/2005 | Thomas et al. |
| 2006/0208472 A1 | 9/2006 | DePottey et al. |
| 2006/0226644 A1 | 10/2006 | Helmstetter |
| 2007/0040366 A1 | 2/2007 | Maidel et al. |
| 2009/0039630 A1 | 2/2009 | Schneider et al. |
| 2009/0256338 A1 | 10/2009 | Williams |
| 2011/0121549 A1 | 5/2011 | Parks et al. |
| 2011/0285114 A1* | 11/2011 | Ohara ............... B60R 21/206 280/730.1 |
| 2012/0068444 A1* | 3/2012 | Suzuki ............... B60R 21/239 280/739 |
| 2013/0049336 A1* | 2/2013 | Fukawatase ........ B60R 21/2338 280/741 |
| 2013/0119645 A1 | 5/2013 | Eckert et al. |
| 2014/0217712 A1* | 8/2014 | Nakamura .......... B60R 21/2338 280/739 |

FOREIGN PATENT DOCUMENTS

| | | |
|---|---|---|
| DE | 10 2005 012 614 A1 | 10/2005 |
| DE | 10 2005 039 418 A1 | 3/2007 |
| DE | 20 2011 001 429 U1 | 5/2011 |
| EP | 1 506 105 B1 | 2/2005 |
| GB | 2 306 409 A | 5/1997 |
| WO | WO-2009/020786 A1 | 2/2009 |

* cited by examiner

GAS BAG ARRANGEMENT FOR A VEHICLE OCCUPANT RESTRAINT SYSTEM

CROSS-REFERENCE TO A RELATED APPLICATION

This application is a National Phase Patent Application of International Patent Application Number PCT/EP2013/063248, filed on Jun. 25, 2013, which claims priority of German Patent Application Number 10 2012 210 756.8, filed on Jun. 25, 2012.

BACKGROUND

This invention relates to a gas bag arrangement for a vehicle occupant restraint system.

Such gas bag arrangement, which comprises a gas bag with a vent device, a control element cooperating with the vent device, and a release mechanism for releasing the control element, is known from US 2009/0256338 A1. The release mechanism here comprises a cutting device which upon activation of the release mechanism cuts through a ribbon-shaped control element. At least the cutting device, however, must be accommodated outside the gas bag and consists of several individual parts, which renders its manufacture more expensive.

SUMMARY

A problem to be solved by the present invention consists in providing a gas bag arrangement with a release mechanism, which can be manufactured in a rather compact form and at low cost.

According to the invention, there is created a gas bag arrangement for a vehicle occupant restraint system, comprising
  an inflatable gas bag which includes at least one vent device for venting gas from the gas bag, wherein
  the vent device in a first condition has a first outflow cross-section and in a second condition a second outflow cross-section; and
  a release mechanism which initially fixes the vent device, and after activation releases the vent device, wherein
  the release mechanism includes an element to be filled with gas, with which the vent device is connected such that before filling of the fillable element it is fixed at the same and during filling of the fillable element is detached from the same, wherein the vent device is directly or indirectly connected with the fillable element via a releasable connection which will tear during filling of the fillable element and release the vent device.

The vent device in particular is different from the fillable element, i.e. it is a part separate from the fillable element (correspondingly manufactured separately), which is directly or indirectly connected with the fillable element.

Together with the release mechanism, the vent device provides for an adaptive venting of gas from the gas bag, in order to be able to adjust the internal pressure of the gas bag, in particular in dependence on the body height and/or the body weight of the vehicle occupant to be protected with the gas bag.

For example, in the first condition the vent device has a smaller outflow cross-section than in the second condition, so that in the first condition less gas can escape from the gas bag than in the second condition. As compared with the second condition of the vent device, the gas bag thus has a higher internal pressure during inflation and/or after inflation of the gas bag, when the vent device is in its first condition. In particular the vent device is closed in the first condition, so that substantially no gas flows out of the gas bag, while in the second condition it is opened and provides for an outflow of gas from the gas bag.

On the other hand, however, it is also possible that in its first condition the vent device has a greater outflow cross-section (e.g. is completely open) than in the second condition (in which it is e.g. completely closed), i.e. the outflow cross-section is reduced after release of the control element.

The release mechanism is activated in particular in dependence on a signal of a control unit of the vehicle. For example, via seat-integrated sensors the weight of a vehicle occupant is determined and in dependence on the weight it is signaled to the release mechanism that it should likewise be activated on activation of the gas bag (i.e. of an inflation unit provided for inflating the gas bag, e.g. in the form of a gas generator).

The fillable element in particular is formed of a flexible material (e.g. a gas bag material) and e.g. formed in the form of a hose, wherein e.g. after filling it at least sectionally has a hollow cylindrical shape.

The gas bag arrangement according to the invention in particular also includes a control element different from the fillable element, which cooperates with the vent device such that when the control element is fixed, the vent device is held in the first condition and after release of the control element passes from the first into the second condition, wherein the control element is connected with the fillable element via the releasable connection (i.e. is releasably fixed at the fillable element).

It is, however, also conceivable that the vent device is directly connected with the fillable element via the releasable connection and the gas bag arrangement correspondingly includes no control element.

The control element can be formed oblong, e.g. in the form of a ribbon or thread. For example, one end of the oblong control element is connected with an element of the vent device and the other end is connected with an element of the release mechanism, in particular the fillable element.

In particular, one end of the vent device or (if present) the control element in this way is connected with the fillable element. The releasable connection is realized e.g. by a sewn or bonded connection, in particular via at least one tear seam, wherein it in particular can be designed such that initially (i.e. before filling of the inflatable element, i.e. before "activating" the release mechanism) it at least partly closes the fillable element.

It is also possible that the release mechanism comprises a filling device for filling the fillable element, wherein the filling device in particular is present in addition to an inflation unit for inflating the gas bag. The filling device is formed e.g. in the form of a gas generator, in particular a micro gas generator, a squib and/or a compressed gas reservoir, and is fixed e.g. at a carrier. It is also conceivable that the fillable element and/or the inflation unit for inflating the gas bag likewise are fixed at the carrier.

According to a further variant of the invention, the vent device comprises at least one outflow opening of the gas bag, wherein the outflow opening in particular is formed in a gas bag layer defining an inflatable chamber of the gas bag. For example, the size of the outflow opening determines the outflow cross-section of the vent device. In addition, the vent device can comprise a closure element coupled with the fillable element (e.g. via the above-mentioned control element or directly), which in the fixed condition (i.e. in the first condition of the vent device) at least partly closes the outflow opening.

Upon release of the vent device (e.g. the control element) the condition and/or the position of the closure element is changed, so that the outflow opening e.g. is covered less, i.e. the outflow cross-section of the vent device is increased. The opposite case also is possible, namely that in the first condition of the vent device the closure element closes the outflow opening only little (i.e. the vent device has a relatively large outflow cross-section) and when transferring the vent device into the second condition, the outflow cross-section is reduced.

According to a further aspect of the invention the gas bag arrangement includes a housing (module housing), in which both the fillable element and the gas bag are arranged. It is possible in particular that the fillable element is vacuum-packed in a (common) film together with the gas bag, i.e. forms part of a gas bag package, wherein the fillable element extends e.g. inside the gas bag, but can also be arranged outside the gas bag. In addition, further parts of the release device and in particular also the control element can be vacuum-packed in the film together with the gas bag.

It is possible that the fillable element is arranged inside the gas bag. However, this is not absolutely necessary; it rather also is conceivable that the fillable element is located outside the gas bag, wherein the control element cooperates e.g. with a component of the vent device likewise located outside the gas bag. In both cases, the fillable element can be attached independent of the gas bag, i.e. it is not (at least not directly) connected with the gas bag. The fillable element thereby can exert a force (in particular a tensile force) on the vent device, which is required, in order to hold the same in its first condition (i.e. for example in a closed condition).

The gas bag of the gas bag arrangement according to the invention for example is a side gas bag, which in the inflated condition extends between the vehicle occupant to be protected and a vehicle side structure (and is arranged e.g. in or at a vehicle seat or a vehicle door), or a driver or passenger gas bag.

The invention also relates to a vehicle with the gas bag arrangement according to the invention.

BRIEF DESCRIPTION OF THE DRAWINGS

The invention will subsequently be explained in detail by means of exemplary embodiments with reference to the Figures.

DETAILED DESCRIPTION

Figure 1:
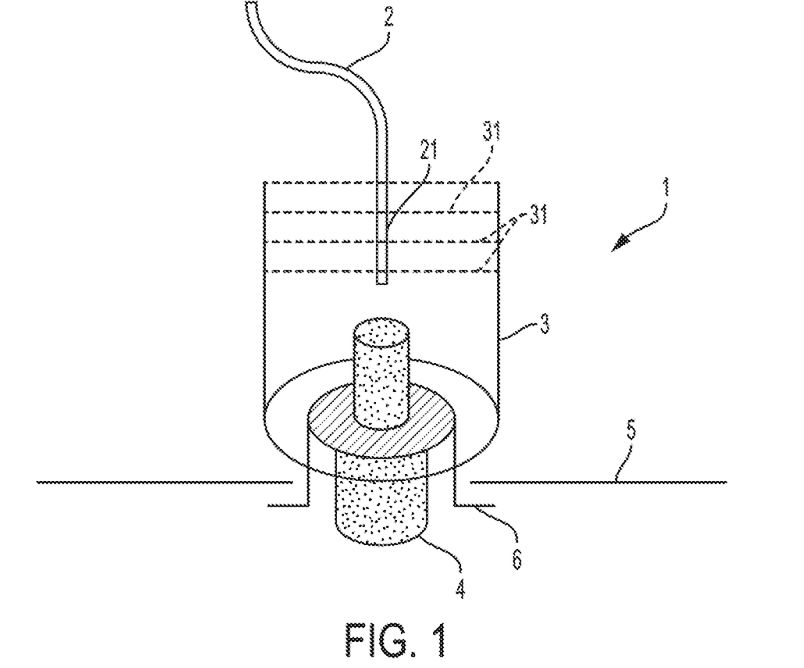
FIG. 1 schematically shows a release mechanism of a gas bag arrangement according to the invention.

The release mechanism 1 shown in FIG. 1 serves for releasing a control element in the form of a ribbon (or thread) 2 in dependence on a control signal. The ribbon 2 serves for controlling a vent device of a gas bag (not shown), via which gas can flow off to the outside from the gas bag interior. For example, one end (the end not shown in FIG. 1) of the ribbon 2 is connected with a component (e.g. a closure element) of the vent device.

The release mechanism 1 comprises a fillable element (in particular formed of a gas bag material) in the form of a pressure hose 3, wherein an end 21 of the ribbon 2 initially is fixed at the pressure hose 3, namely by means of a releasable connection designed as tear connection which comprises a plurality of tear seams 31.

In the fixed condition of the ribbon 2 (i.e. its end 21 is connected with the pressure hose 3 via the tear seams 31) the same can exert a tensile force on the vent device, so that the same also remains in a first condition during inflation of the gas bag, in which it has a first outflow cross-section which e.g. also can be zero, i.e. the vent device is closed and an outflow of gas via the vent device is not possible.

The tear seams 31, however, are designed such that on filling of the pressure hose 3 they tear open as a result of the rising internal pressure in the pressure hose 3 and release the end 21 of the ribbon 2. In the released condition of the ribbon 2, the tensile force exerted on the vent device is reduced or eliminated completely, whereby the vent device passes into a second condition in which it has an enlarged outflow cross-section and gas can flow off from the gas bag interior.

For filling the pressure hose 3 there is used a filling device in the form of a micro gas generator 4, which with one portion protrudes into the pressure hose 3 and can be activated via a signal of a control unit of the vehicle. The micro gas generator 4 is provided in addition to an inflation unit (not shown), which serves for inflating the gas bag.

It is conceivable that the tear seams 31, which in particular are arranged at an end of the pressure hose 3 facing away from the micro gas generator 4, at least partly are designed such that before filling they close the pressure hose 3, in particular its end facing away from the micro gas generator 4, so that e.g. after activating the micro gas generator 4 a rather fast build-up of pressure is effected in the pressure hose 3. For example, the micro gas generator 4 and the pressure hose 3 to be filled by the same are at least partly located inside a gas bag.

The micro gas generator 4 is fixed at a carrier in the form of a clamping plate 5, e.g. by latching or clamping connection, for example via a fixing clip 6. It is also conceivable that the pressure hose 3 likewise is fixed at the clamping plate 5.

Figure 2:
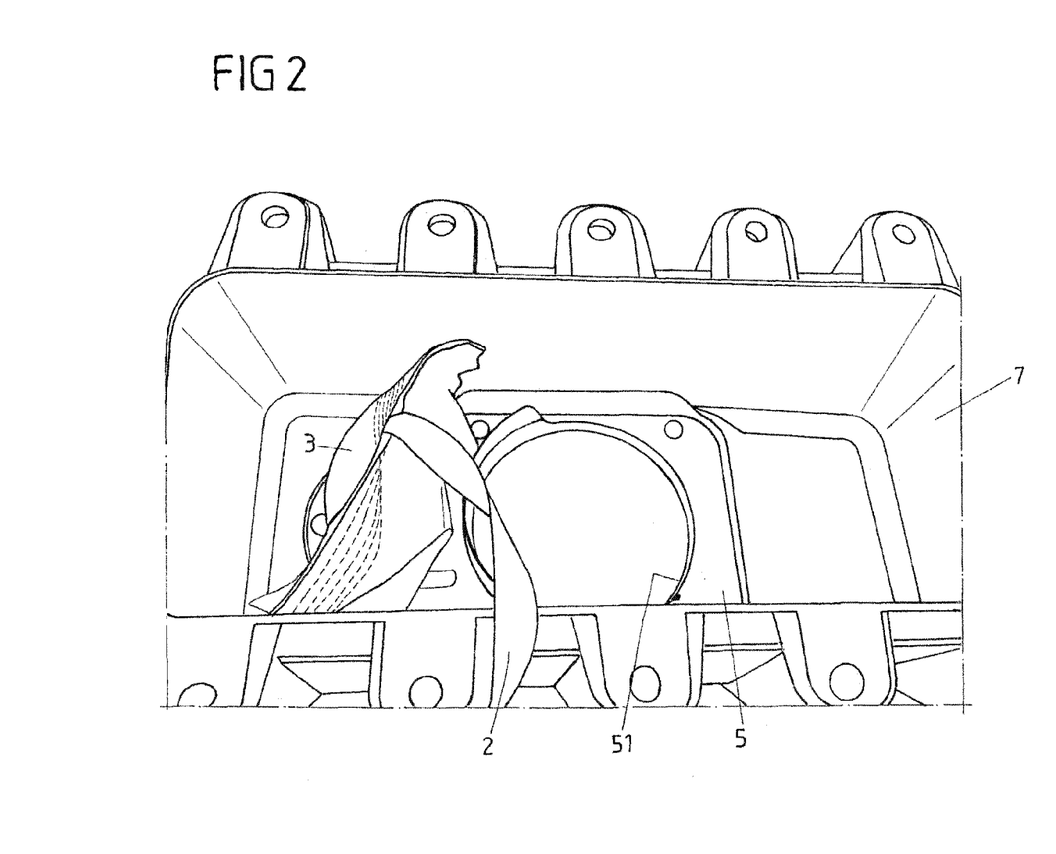
FIG. 2 schematically shows a release mechanism inserted into a housing of a gas bag arrangement according to the invention.

A possibility for the arrangement of the release mechanism 1 and the ribbon 2 according to FIG. 1 in a gas bag arrangement (gas bag module) is shown in FIG. 2. Accordingly, the pressure hose 3 is located in a housing 7 of the gas bag module and is attached to a carrier 5 likewise arranged at the housing 7. The pressure hose 3 (with one end) likewise is fixed at the carrier 5. In addition, the carrier 5 includes an opening 51 for accommodating an inflation unit in the form of a further gas generator (not shown), which serves for inflating the gas bag (likewise not shown).

Figure 3:
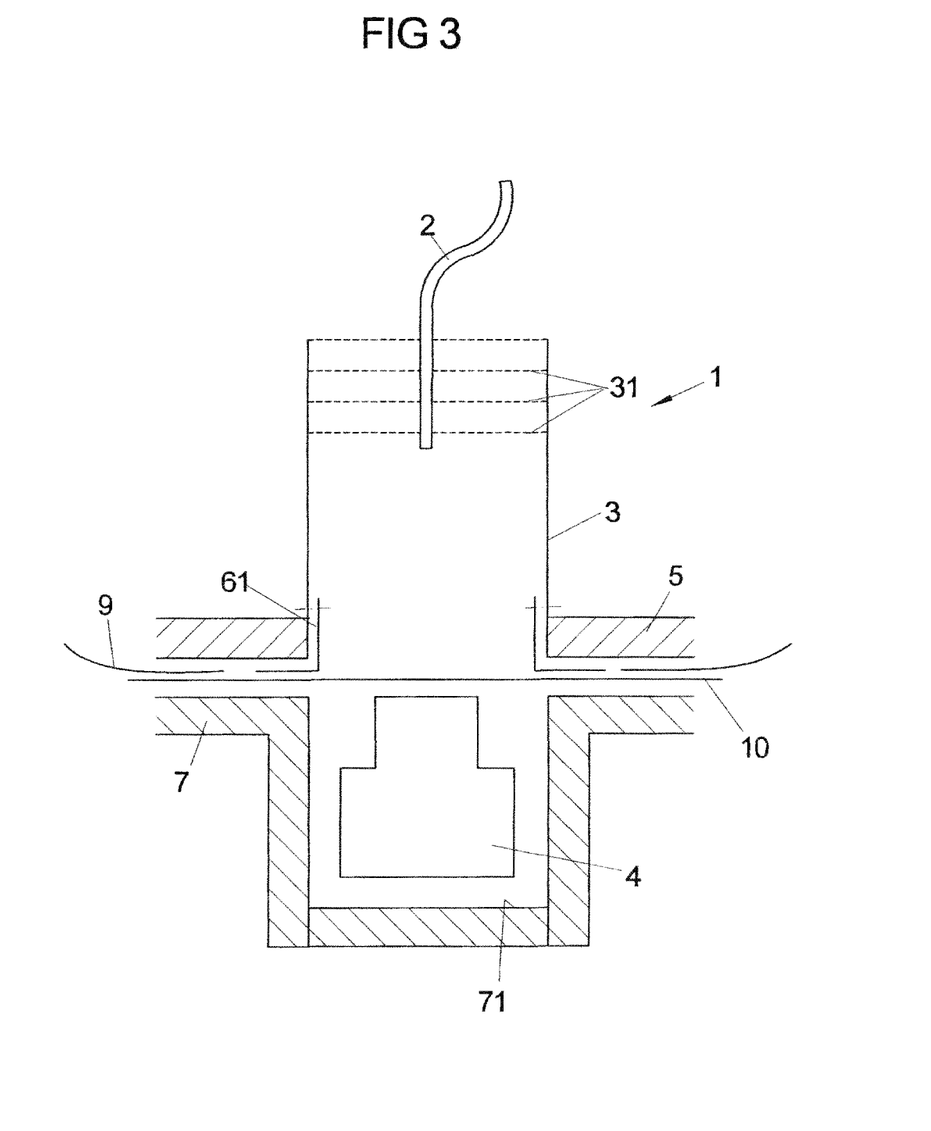
FIG. 3 shows a section of a gas bag arrangement according to the invention.

As shown in FIG. 3, it is possible that the release mechanism 1 is part of a gas bag package, wherein in particular the pressure hose 3, the clamping plate (retaining plate) 5 and the ribbon 2 together with the gas bag 9 are vacuum-packed in a vacuum film 10. The vacuum film 10 extends between the clamping plate 5 and an inside of the module housing 7.

The pressure hose 3 in particular is attached to the clamping plate 5 via one or more clamping elements 61, wherein it is arranged such that it extends inside the gas bag 9. Correspondingly, the ribbon 2 also extends in the interior of the gas bag 9 and cooperates e.g. with a vent device shown in FIGS. 4A and 4B.

The micro gas generator 4 provided for filling the pressure hose 3 is arranged at the module housing 7, namely in a bulge 71 of the module housing 7 extending away from the clamping plate 5.

Figure 4A:
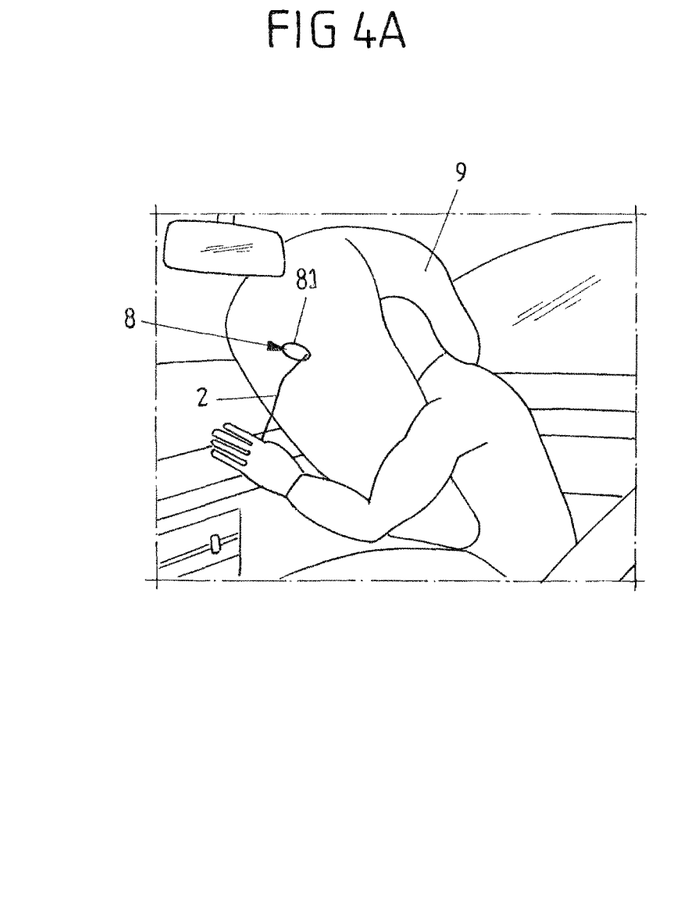
FIGS. 4A and 4B show a gas bag arrangement according to the invention with closed and open vent device, respectively.
Figure 4B:
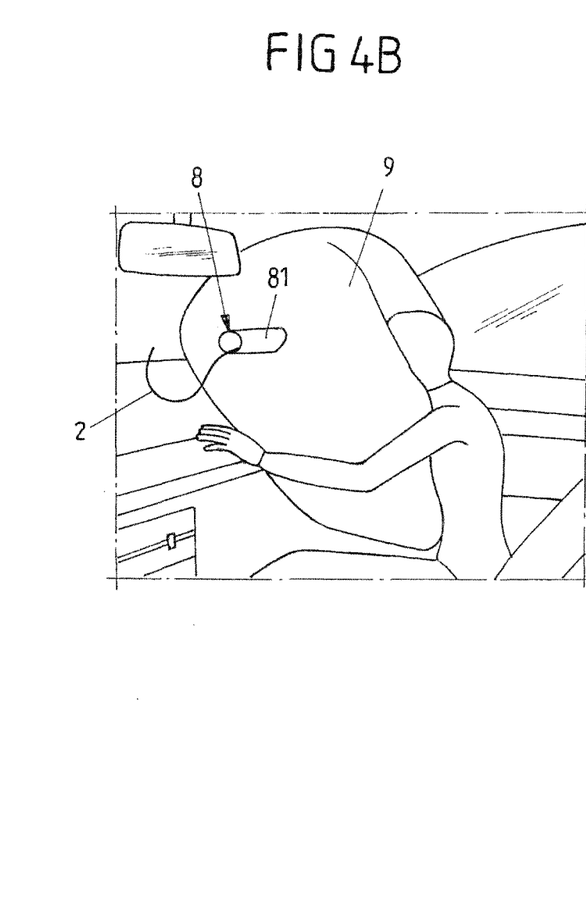

FIGS. 4A and 4B relate to a gas bag arrangement according to the invention, which is equipped e.g. with a release mechanism according to FIG. 1 or 2 (wherein the release mechanism is not shown in these Figures). The gas bag arrangement in turn includes a control element formed as ribbon 2, which cooperates with a vent device 8 of the gas bag 9.

The vent device 8 comprises a closure element in the form of a closure hose 81, which before activating the release mechanism, i.e. when the ribbon 2 is fixed at the pressure hose 3 of FIG. 1, closes an outflow opening formed in an envelope of the gas bag 9. This (first) condition of the vent device 8 is shown in FIG. 4A, wherein the vent device 8 is closed in this condition. The release mechanism has not been activated on triggering of the gas bag 9, as on the passenger seat associated to the gas bag 9 a relatively heavy vehicle occupant is seated, so that a higher internal pressure of the gas bag 9 is desired.

When a lighter vehicle occupant (e.g. a child) is detected on the passenger seat, the release mechanism also is activated, and the ribbon 2 is released, on triggering of the gas bag 9 or during inflation of the gas bag 9. When the ribbon 2 is released, the vent device 8 gets into a second condition in which it has a larger outflow cross-section than in the first condition. In particular, the outflow opening in the gas bag 9, which initially is (e.g. completely) closed by means of the closure hose 81, is cleared (opened) completely after release of the ribbon 2. Opening of the outflow opening is effected in that the closure hose 81 is unfolded after release of the ribbon 2 and finally extends such that it no longer covers the outflow opening of the gas bag 9 (cf. FIG. 4B). For example, the unfolded closure hose 81 has an outflow cross-section which at least approximately corresponds to the diameter of the outflow opening of the gas bag 9.

In particular, it is also possible that the gas bag arrangement shown in FIGS. 4A and 4B is formed as "gas bag package", wherein in particular the gas bag 9, the pressure hose 3, the ribbon 2 and the closure hose 81 are vacuum-packed inside a film. In this variant, the ribbon 2 extends e.g. inside the gas bag 9.

Figure 5:
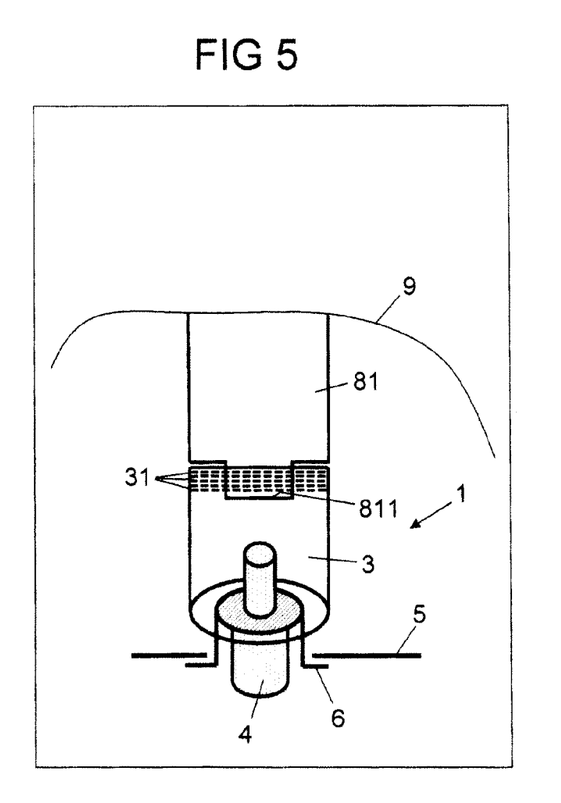
FIG. 5 shows a gas bag arrangement according to a further exemplary embodiment of the invention.

FIG. 5 relates to a modification of FIGS. 4A and 4B. Accordingly, there is likewise provided a closure hose 81. At its one end, however, the closure hose 81 forms at least one tab 811 which acts as control element. Beside the tab 811 no further control element is present. The tab 811 is connected with the pressure hose 3 via a plurality of tear seams 31. The tear seams 31 are undone on filling of the pressure hose 3, whereby the tab 811 and correspondingly the closure hose 81 is released.

Figure 6:
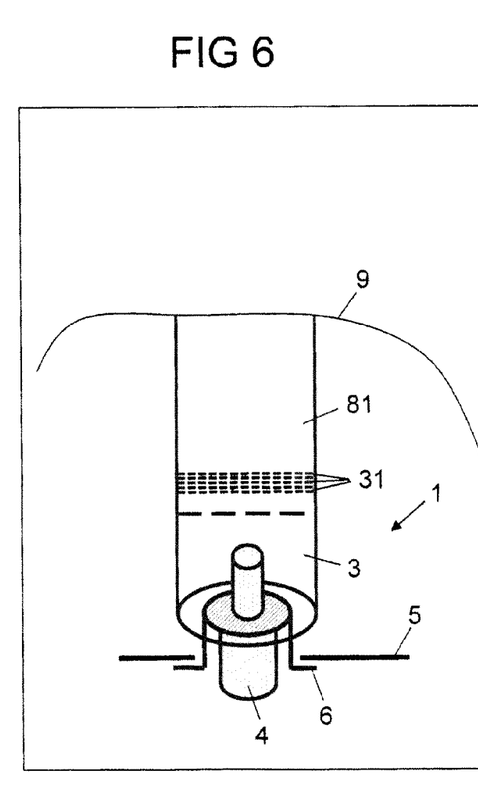
FIG. 6 shows a gas bag arrangement according to still another exemplary embodiment of the invention.

FIG. 6 schematically shows a further exemplary embodiment of the invention. In a modification of FIG. 5, there is not provided a separate control element, but the closure hose 81 is directly connected with the pressure hose 3 via the tear seams 31. It is conceivable that the end of the closure hose 81 connected with the pressure hose 3 extends into the pressure hose 3, i.e. has a slightly smaller diameter than the pressure hose 3.

The end of the closure hose 81, however, also might have a slightly larger diameter than the pressure hose 3 and correspondingly one end of the pressure hose 3 might in part be located in the closure hose 81. It is also possible that an end face of the closure hose 81 rests on an end face of the pressure hose 3, i.e. the end of the closure hose 81 is connected edge on edge with one end of the pressure hose 3 via the tear seams 31. Due to the direct connection of the closure hose 81 with the pressure hose 3, in particular an undesired escape of gas from the gas bag via the closed pressure hose 81, which can occur in the closure hose connected with the pressure hose 3 via the ribbon 2 as shown in FIGS. 4A and 4B, can be avoided. In addition, due to the omission of a separate control ribbon the gas bag arrangement can be manufactured at rather low cost.

It should be noted that the gas bag arrangement according to the invention can of course also include different types of vent device, i.e. the release mechanism also can cooperate with other components than the closure hose 81 shown in FIGS. 3A and 3B. It is conceivable, for example, that a flat covering element of the vent device initially covers an outflow opening in the gas bag and after releasing the ribbon 2 is drawn into an open position (for example by the deploying gas bag).

LIST OF REFERENCE NUMERALS 1 release mechanism
2 ribbon
3 pressure hose
4 micro gas generator
5 clamping plate
6 fixing clip
7 housing
8 vent device
9 gas bag
10 vacuum film
21 end
31 tear seam
61 fixing element
71 bulge
81 closure hose
811 tab

The invention claimed is:

1. A gas bag arrangement for a vehicle occupant restraint system, comprising an inflatable gas bag which includes at least one vent device for venting gas from the gas bag, wherein the vent device in a first condition has a first outflow cross-section and in a second condition a second outflow cross-section; and a release mechanism which initially fixes the vent device and after activation releases the vent device, wherein the release mechanism includes an element that can be filled with gas, with which the vent device is connected to the fillable element such that before filling of the fillable element the vent device is fixed at the fillable element and during filling of the fillable element the vent device is detached from the fillable element, wherein the vent device comprises a closure element for at least partially closing an outflow opening of the gas bag, and wherein the closure element is indirectly or directly connected with the fillable element via a releasable connection which will tear during filling of the fillable element and release the vent device.

2. The gas bag arrangement according to claim 1, wherein the vent device is different from the fillable element.

3. The gas bag arrangement according to claim 1, further comprising a control element wherein when the control element is fixed, the vent device is held in the first condition and after release of the control element passes from the first into the second condition, wherein the control element is connected with the fillable element via the releasable connection.

4. The gas bag arrangement according to claim 1, wherein the vent device is directly connected with the fillable element via the releasable connection.

5. The gas bag arrangement according to claim 1, wherein the fillable element is formed in the form of a hose.

6. The gas bag arrangement according to claim 3, wherein the control element is formed oblong.

7. The gas bag arrangement according to claim 6, wherein the control element is formed in the form of a ribbon or thread.

8. The gas bag arrangement according claim 1, wherein the releasable connection is realized by at least one tear seam.

9. The gas bag arrangement according to claim 1, wherein the releasable connection initially at least partly closes the fillable element.

10. The gas bag arrangement according to claim 1, wherein the release mechanism comprises a filling device for filling the fillable element.

11. The gas bag arrangement according to claim 10, further comprising an inflation unit for inflating the gas bag.

12. The gas bag arrangement according to claim 10, further comprising a carrier at which the filling device is fixed.

13. The gas bag arrangement according to claim 12, wherein the fillable element is fixed at the carrier.

14. The gas bag arrangement according to claim 13, further comprising a control element wherein the vent device is configured so that when the closure element at least partly closes the outflow opening when the control element is fixed to the fillable element.

15. The gas bag arrangement according to claim 14, wherein the closure element comprises a hose.

16. The gas bag arrangement according to claim 1, further comprising a housing in which the fillable element and the gas bag are arranged.

17. The gas bag arrangement according to claim 1, wherein the gas bag and the fillable element are vacuum-packed in a film.

* * * * *